United States Patent [19]
Bartoletto

[11] Patent Number: 4,886,485
[45] Date of Patent: Dec. 12, 1989

[54] TAPER-LOC DRAG LINK AND PIN

[76] Inventor: A. J. Bartoletto, 1975 Tuckaway Dr., Bloomfield Hills, Mich. 48013

[21] Appl. No.: 308,462

[22] Filed: Feb. 10, 1989

[51] Int. Cl.4 ............................................. F16G 13/06
[52] U.S. Cl. ....................................... 474/219; 474/234
[58] Field of Search .............................. 474/219–226, 474/230, 234; 59/84, 85, 88

[56] References Cited

U.S. PATENT DOCUMENTS

| 494,962 | 4/1893 | Ley | 474/234 |
| 670,285 | 3/1901 | Levalley | 474/234 X |
| 764,298 | 7/1904 | Ley | 474/234 |
| 1,152,476 | 9/1915 | Bixby | 474/219 |
| 1,694,275 | 12/1928 | Merwin | 474/219 |

Primary Examiner—Thuy M. Bui
Attorney, Agent, or Firm—Lloyd M. Forster

[57] ABSTRACT

Drag chain link and pin construction providing press fit nonrotational seating of pin ends in bifurcated boss ended arms of each link thereby excluding introduction of abrasive, wear producing particles, particularly encountered in cement manufacturing kilns.

6 Claims, 2 Drawing Sheets

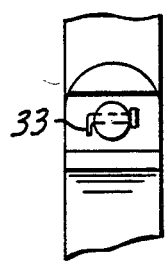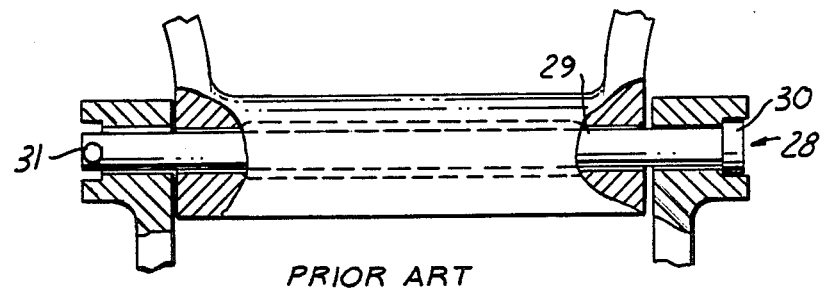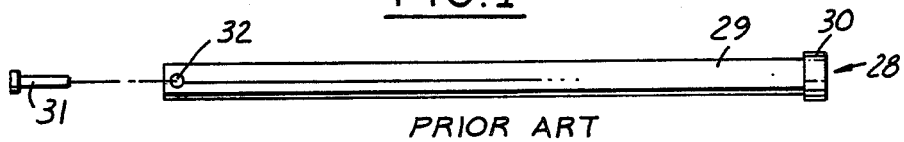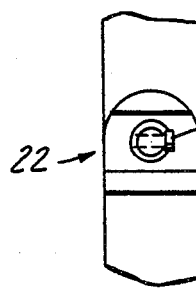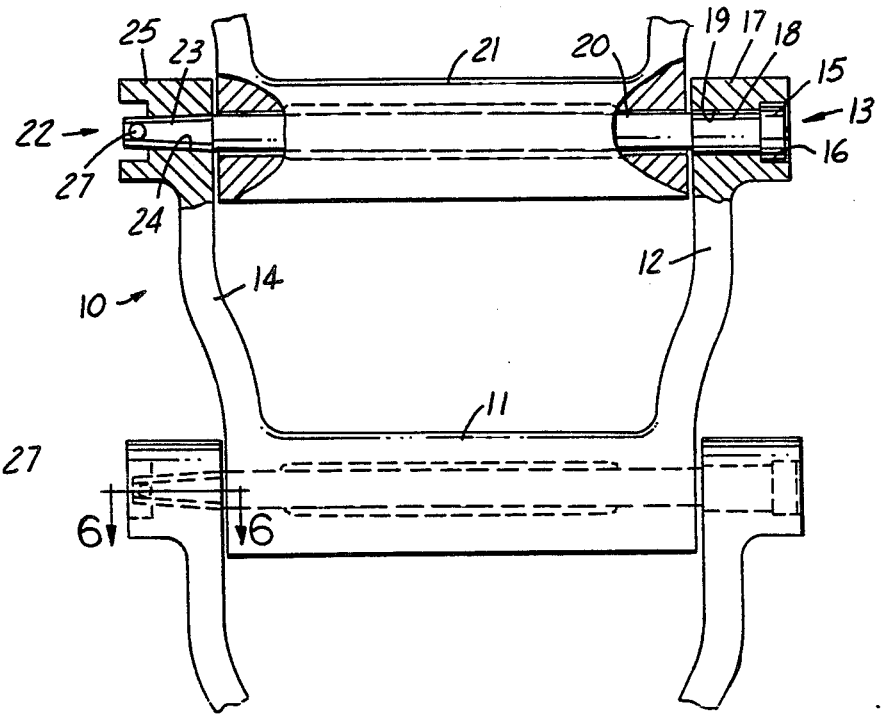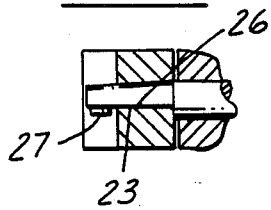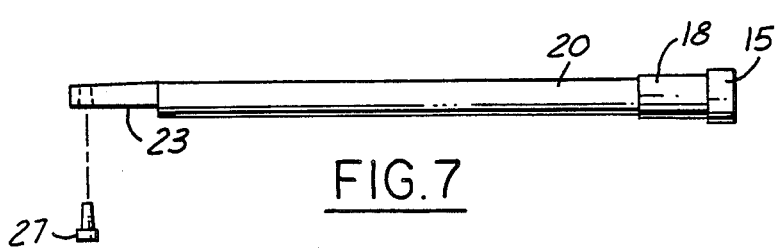

TAPER-LOC DRAG LINK AND PIN

BACKGROUND OF THE INVENTION

Drag chains employed in the cement industry encounter a hostile abrasive environment tending to produce rapid wear. Cement is primarily made of limestone, and hard igneous rock materials in rotary kilns. Kilns are fired at one end heating the materials which mixes under the rotary action of the kiln, progresses through four chemical reactions at high temperatures and emerges as cement clinker at the output end. After this, the clinker is cooled and moved to the ball mills. A sequence of drag links joined to each other by pins comprise the endless drag chain which is driven by a sprocket and conveys the abrasive material along the bottom of a trough to the ball mills for final grinding.

Each link of the drag chain has a barrel at one end with side arms extending lengthwise and outward sufficient to reach the barrel of the next link. A pintle pin crosses through a hole in the barrel of one link and boss holes in the extremities of the two side arms of the next link to connect the successive identical cast drag links and form the endless drag chain. Conventional pintle pins are normally constructed of uniform diameter steel rod headed at one end with a headed locking pin inserted in a crosshole at the other end and retained by a cotter pin. The rods normally have loose fits in all of the link holes through which they pass and are particularly vulnerable to the introduction of abrasive grit near the ends of the pins in the holes in the exposed bosses on the extremities of the arms of the drag links. Excessive wear occurs there between the ends of the pins and the side arm boss holes of the links engaged by such ends.

BRIEF DESCRIPTION OF THE TAPER-LOC PIN INVENTION

The ends of the TAPER-LOC PINS are adapted for press fit respectively in each of the side arm bosses of the drag link engaging such ends. The usual pivotal clearance fit is confined to the center barrel element of the link. The TAPER-LOC PIN is provided with a head seated in a counterbore in one of the link side arm bosses; a reduced shoulder for a tight fit in the bore extending through said side arm boss; a further reduced shaft passing through the barrel with a pivotal fit; a further reduced tapered end having a flat face driven into the other side arm boss with a tight fit in a matching tapered boss hole having a matching flat to positively prevent the TAPER-LOC PIN from rotating; and a cross locking pin press fitted into a hole through the tapered pin near that end as a redundant safety feature to positively prevent link pin extraction under any condition.

The tight bit at both ends of the TAPER-LOC PIN and the side arm holes which engage them prevent abrasive grit from entering and the matching flats prevent rotation between the TAPER-LOC PIN and the boss holes in the drag link arms both of which greatly reduce wear which is the objective of the invention.

BRIEF DESCRIPTION OF THE DRAWINGS

FIG. 1 is a fragmentary partially sectioned view of a prior art chain link and pivotal pin connection;

FIG. 2 is a view of the connecting and retaining pins per se shown assembled in FIG. 1;

FIG. 3 is an end view of the pin connection shown in FIG. 1;

FIG. 4 is a partially sectioned plan view of of a drag chain link and pin assembly illustrating the TAPER-LOC DRAG LINK AND PIN construction of the present invention;

FIG. 5 is an end view of the chain link illustrated in FIG. 4;

FIG. 6 is a fragmentary sectional detail view of the TAPER-LOC PIN end per se of the present invention;

FIG. 7 is a view of the link pin and locking pin per se shown assembled in FIG. 4;

DETAILED DESCRIPTION OF PREFERRED EMBODIMENTS

Figure 8:
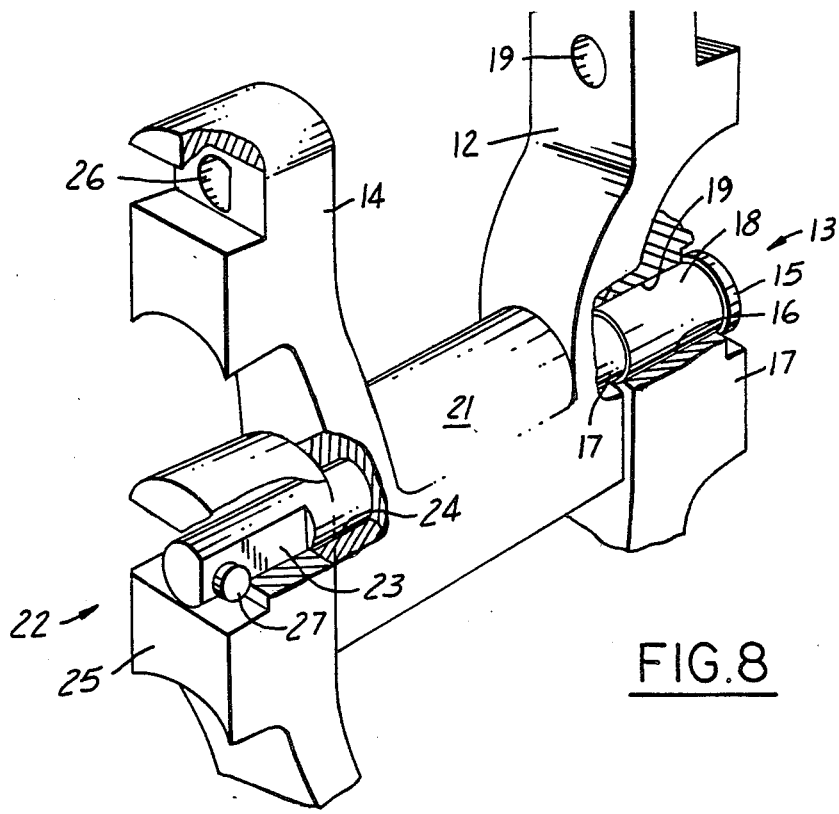
FIG. 8 is a perspective view of the TAPER-LOC DRAG LINK AND PIN assembly of the present invention partially sectioned to illustrate the interlocking construction.

With reference to FIG. 4, bifurcated drag chain link 10 comprises central barrel 11, having integral side arm 12 for receiving the headed end of link pivot pin 13, and side arm 14 for receiving the other end. Pin 13 is provided with head 15 fitting within counterbore 16 in boss 17 at the end of side arm 12. Next to the head, a slightly reduced shoulder 18 on pin 13 provides a tight fit in boss bore 19 followed by further reduced shaft 20 projecting through barrel 21 with a pivotal fit. Tapered end 22 of pin 13 with flat 23 engages tapered aperture 24 in boss end 25 of side bar 14. Referring to FIG. 6, flat 26 of the aperture matches pin flat 23 to positively prevent rotation when driven in place. Locking pin 27 extends through tapered end 22 (FIG. 4) with a press fit to complete the assembly.

In comparison, with reference to FIGS. 1–3, conventional link pin 28 comprises simply straight shaft 29 headed at 30 and, at the other end, with locking pin 31 passing through hole 32 secured by bent end 33. Pin 28 has a loose fitting clearance with all elements of the link providing access for abrasive grit leading to relatively rapid wear. In contrast, the press fit of the present TAPER-LOC PIN in each of the side arm bosses positively excludes any entrance of abrasive material at either end of the link pin so that only the relatively protected and inaccessible clearance between the barrel and bosses of adjacent links offers any potential opening for intrusion of abrasive particles.

I claim:

1. Drag chain link and pin assembly comprising bifurcated link with integral arms extending from apertured barrel, said arms having end bosses spanning the barrel of an adjacent link with barrel-aligned connecting pin apertures characterized by connecting pin means positively secured against rotation in said bosses, and tight fit arm boss and connecting pin means for excluding entrance of abrasive material.

2. Combination of claim 1 wherein said connecting pin means includes interengaging flat surface boss and connecting pin means.

3. Combination of claim 1 wherein said boss and connecting pin means includes interengaging tapered surface boss and connecting pin means.

4. Combination of claim 1 wherein said boss and connecting pin means comprises a tight fit shoulder engagement between said connecting pin and boss at one end, and a tight tapered surface engagement between said boss and said connecting pin at the other end.

5. Combination of claim 4 including a press fit locking pin extending through said tapered end.

6. Combination of claim 4 including an enlarged head fitting within a counterbore in said boss at one end providing an assembly limit for said tight fit shoulder engagement adjacent said shoulder.

* * * * *